United States Patent
Vo et al.

(10) Patent No.: US 10,501,681 B2
(45) Date of Patent: Dec. 10, 2019

(54) INORGANIC CLAY PARTICULATE ADDITIVE FOR CONSOLIDATING TREATMENTS

(71) Applicant: Halliburton Energy Services, Inc., Houston, TX (US)

(72) Inventors: Loan K. Vo, Houston, TX (US); Dipti Singh, Kingwood, TX (US); Christopher Parton, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/321,215

(22) PCT Filed: Sep. 2, 2016

(86) PCT No.: PCT/US2016/050119
§ 371 (c)(1),
(2) Date: Jan. 28, 2019

(87) PCT Pub. No.: WO2018/044320
PCT Pub. Date: Mar. 8, 2018

(65) Prior Publication Data
US 2019/0153297 A1    May 23, 2019

(51) Int. Cl.
*C09K 8/57*       (2006.01)
*C09K 8/575*      (2006.01)
(Continued)

(52) U.S. Cl.
CPC ............ *C09K 8/572* (2013.01); *C09K 8/5755* (2013.01); *C09K 8/5756* (2013.01); *C09K 8/805* (2013.01);
(Continued)

(58) Field of Classification Search
CPC ...... C09K 8/572; C09K 8/5756; C09K 8/805; E21B 43/025
See application file for complete search history.

(56) References Cited

U.S. PATENT DOCUMENTS

2004/0000402 A1    1/2004  Nguyen et al.
2007/0036977 A1*   2/2007  Sinclair .................. C09K 8/805
                                                          428/403
(Continued)

FOREIGN PATENT DOCUMENTS

WO      2009/063165 A1    5/2009

OTHER PUBLICATIONS

International Search Report and Written Opinion issued in related PCT Application No. PCT/US2016/050119 dated May 26, 2017, 16 pages.

*Primary Examiner* — Zakiya W Bates
*Assistant Examiner* — Crystal J Miller
(74) *Attorney, Agent, or Firm* — Thomas Rooney; Baker Botts L.L.P.

(57) ABSTRACT

Systems and methods for treating subterranean formations using deagglomerated inorganic clay particles are provided. In one embodiment, the methods comprise: providing a treatment fluid that comprises a base fluid, a consolidating agent, and a deagglomerated inorganic clay particle; introducing the treatment fluid into at least a portion of a subterranean formation so as to contact unconsolidated particles within the subterranean formation with the treatment fluid; and allowing the consolidating agent and the deagglomerated inorganic clay particle to consolidate at least a portion of the unconsolidated particulates in the portion of the subterranean formation.

13 Claims, 2 Drawing Sheets

(51) Int. Cl.
*C09K 8/80* (2006.01)
*E21B 43/02* (2006.01)
(52) U.S. Cl.
CPC ........ *C09K 2208/10* (2013.01); *E21B 43/025* (2013.01)

(56) References Cited

U.S. PATENT DOCUMENTS

| | | | |
|---|---|---|---|
| 2007/0289781 A1* | 12/2007 | Rickman | C09K 8/68 175/65 |
| 2010/0286000 A1 | 11/2010 | Huang et al. | |
| 2013/0292116 A1 | 11/2013 | Nguyen et al. | |
| 2014/0090842 A1* | 4/2014 | Patil | C04B 40/0039 166/293 |

\* cited by examiner

INORGANIC CLAY PARTICULATE ADDITIVE FOR CONSOLIDATING TREATMENTS

CROSS-REFERENCE TO RELATED APPLICATION

The present application is a U.S. National Stage Application of International Application No. PCT/US2016/050119 filed Sep. 2, 2016, which is incorporated herein by reference in its entirety for all purposes.

BACKGROUND

The present disclosure relates to systems and methods for treating subterranean formations with treatment fluids comprising a consolidating agent and inorganic clay particulates.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal operations, consolidation operations, and the like.

Proppant is commonly used in conjunction with fracturing operations. A fracturing fluid is pumped at a sufficiently high flow rate and high pressure into the wellbore and into the subterranean formation to create or enhance a fracture in the subterranean formation. Creating a fracture typically involves making a new fracture in the formation. Enhancing a fracture typically involves enlarging a pre-existing fracture in the formation. The newly-created or enhanced fracture may tend to close together after pumping of the fracturing fluid has stopped. To prevent the fracture from closing, a proppant material may be placed in the fracture to keep the fracture propped open. The proppant is typically in the form of solid particles, which are generally suspended in the fracturing fluid, carried down hole, and deposited in the fracture as a proppant pack. The proppant pack props the fracture in an open position while allowing fluid flow through the permeability of the pack.

If the proppant is not held in place after pumping the fracturing fluid, then the proppant particles can flow towards the wellhead during production. This migration of proppant can cause damage to wellbore equipment and potentially a loss of integrity, for example, to the fracture or wellbore. Therefore, it is often desirable to coat the particles with a consolidating agent to form a consolidated pack. The consolidating agent can be included in the fracturing fluid or subsequently introduced into the formation. The consolidating agent should have an affinity for the particles and may bind to the particles. The consolidating agent can be a tacky consolidating agent that acts as a glue to bind the particles of the pack together. The consolidating agent can also be part of a consolidation system that generally comprises a curable resin and a curable agent. The curable agent causes the curable resin to cure and become hard and solid via a chemical reaction. After the resin cures, the particles of the pack are considered to be consolidated.

Furthermore, hydrocarbon wells are often located in subterranean zones that contain unconsolidated particulates that may migrate within the subterranean formation with the oil, gas, water, and/or other fluids produced by the wells. The presence of particulates, such as formation sand, in produced fluids may be disadvantageous or undesirable in that the particulates may abrade pumping and other producing equipment and reduce the fluid production capabilities of the producing zones. Unconsolidated subterranean zones include those that contain loose particulates and those wherein the bonded particulates have insufficient bond strength to withstand the forces produced by the flow of fluids through the zones.

A method used to control particulates in unconsolidated formations involves consolidating unconsolidated subterranean producing zones into hard, permeable masses by applying a resin composition to the unconsolidated particulates. Another method involves placing a tackifying composition to the unconsolidated particulates in an effort to reduce the migration of particulates within the zone. Whereas a resin composition typically produces a hard mass, the use of a tackifying composition typically produces a more malleable consolidated mass.

BRIEF DESCRIPTION OF THE DRAWINGS

These drawings illustrate certain aspects of some of the embodiments of the present disclosure, and should not be used to limit or define the claims.

Figure 1:
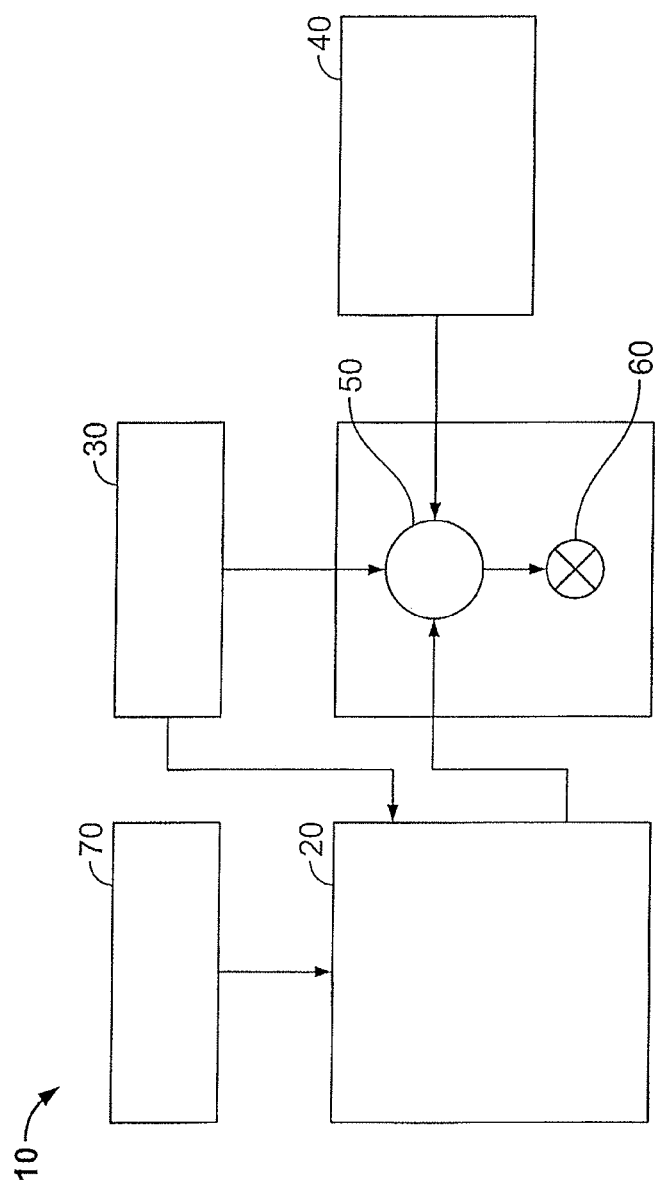
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for treating a subterranean formation with a treatment fluid comprising an inorganic clay particulate and a consolidating agent.

The present disclosure provides methods and systems for treating a subterranean formation comprising: providing a treatment fluid that comprises a base fluid, a consolidating agent, and an deagglomerated inorganic clay particle; introducing the treatment fluid into at least a portion of a subterranean formation so as to contact unconsolidated particles within the subterranean formation with the treatment fluid; and allowing the consolidating agent and the deagglomerated inorganic clay particle to consolidate at least a portion the coated unconsolidated particulates in the portion of the subterranean formation. In certain embodiments, the present disclosure provides methods and systems for treating a subterranean formation comprising: providing a consolidating agent, a plurality of proppant particulates, and an deagglomerated inorganic clay particulate; introducing the consolidating agent, the plurality of proppant particulates, and the deagglomerated inorganic clay particulate into at least a portion of a subterranean formation; allowing the consolidating agent to at least partially coat the proppant particulates, thereby creating coated proppant particulates; and placing the coated proppant particulates and the deagglomerated inorganic clay particulate in at least a portion of the subterranean formation so as to form a proppant pack.

Without limiting the disclosure to any particular theory or mechanism, it is believed that the inorganic clay particulates may serve as useful additives to consolidating agents, at least in part due to their unique structure. In certain embodiments, deagglomerated inorganic clay particulates, such as halloysite and hectorite, may form structures such as nanotubes. These structures comprise several attachment points where resins may attach. The resins in turn may attach to other nanostructures or other particles present, such as fines or proppants. This interconnectivity of the resin with the clay particulate structures allows the deagglomerated inorganic clay particulates to form durable networks. For example, a clay nanoparticle may attach to a resin, which may in turn attach to another clay nanoparticle or other particle. These durable networks may serve to increase the strength and longevity of a system comprising a resin or any other consolidating agent.

Among the many potential advantages to the methods and compositions of the present disclosure, only some of which are alluded to herein, the methods, compositions, and systems of the present disclosure may decrease the amount of resin or other consolidating agent needed in a treatment without affecting the permeability or tensile strength of the formation or proppant pack being treated. In certain embodiments, the inorganic clay particulates may increase the thermal limits of the consolidating agent, allowing the consolidating agent to function in temperature ranges at which the consolidating agent would not function properly by itself. In certain embodiments, the inorganic clay particulates may increase the longevity of the consolidation treatment. In certain embodiments, the inorganic clay particulates may increase the consolidation strength of the proppant pack or other consolidated region after treatment.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

In certain embodiments, the treatment fluids used in the methods and systems of the present disclosure may comprise and/or be used to treat one or more proppant particulates, among other reasons, to be placed within fractures in the formation. In some embodiments, a plurality of proppant particulates may reside and/or be deposited in a fracture treated according to the methods of the present disclosure. Examples of materials that may be suitable for use as proppant particulates in certain embodiments of the present disclosure include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof.

In certain embodiments, the proppant particulates may have an average size that ranges from greater than about 100 mesh, U.S. Sieve Series. The shape of the proppant particulates may be any shape known in the art, including substantially spherical, pellets, flattened pellets, flakes, polygonal (such as cubic), and mixtures thereof. In certain embodiments, the size and shape may depend on, among other factors, the pore throat size, pore size of the proppant pack, pore size of the sand pack, fracture width, and/or other characteristics of the subterranean formation. In other embodiments, the proppant particulates may comprise microproppant materials. Examples of microproppant materials that may be suitable for use in certain embodiments of the present disclosure include, but are not limited to, fly ash, silica, alumina, fumed carbon, carbon black, graphite, mica, titanium dioxide, metal-silicate, silicate, kaolin, talc, zirconia, boron, hollow microspheres, glass, calcined clays, partially calcined clays, and any combination thereof.

The treatment fluids used in the methods and systems of the present disclosure comprise inorganic clay particulates. In some embodiments, these inorganic clay particulates may comprise any type of inorganic clay, including but not limited to halloysite, hectorite, aluminum silicates, and any combinations thereof. In certain embodiments, the inorganic clay particulates may comprise particulates in all known shapes, including substantially spherical, pellets, flattened pellets, flakes, rings, tubes, polygonal (such as cubic), and mixtures thereof. In certain embodiments, the deagglomerated inorganic clay particulates may comprise tube shaped particles, such as nanotubes. In some embodiments, the inorganic clay particulates may be deagglomerated particulates, such as deagglomerated nanoparticles or deagglomerated nanotubes.

The term "deagglomerated" does not necessarily mean that the agglomerates comprising the inorganic clay particulate have been broken down completely into individual inorganic nanotubes or other nanostructures. Rather, in the present disclosure, "deagglomerated" indicates that the agglomerates comprising the nanostructures have undergone some type of processing to deagglomerate the agglomerates that may have formed during storage or production of the nanostructures. For example, in some embodiments, at least a portion or even substantially all of the inorganic nanotubes in a deagglomerated inorganic clay are in the form of individual inorganic nanotubes. For example, at least about 50% or more of the inorganic nanotubes in a deagglomerated inorganic clay may be in the form of individual inorganic nanotubes. In some embodiments, at least about 60%, at least about 70%, at least about 80%, or at least about 90% of the inorganic nanotubes in a deagglomerated inorganic clay may be in the form of individual inorganic nanotubes.

These inorganic clay particulates may include all known sizes of materials including nanoparticles and nanotubes, which may range from about 1 pm to about 1000 nm in length. In certain embodiments, the inorganic clay particulates may comprise nanotubes, which may range from about 0.2 nm to about 1 nm in length. A person skilled in the art, with the benefit of this disclosure, will recognize the types, sizes, and shapes of particles that may be used in the fluids of the present disclosure for a particular application. In certain embodiments, the inorganic clay particulates may comprise aluminum silicate nanotubes, halloysite nanotubes, hectorite nanotubes, and any combination thereof.

The inorganic clay particulates may be present in the treatment fluids used in the methods of the present disclosure in an amount sufficient to provide the desired functionality. In certain embodiments, the deagglomerated inorganic clay particulates may be present in the treatment fluid in the amount such the weight ratio of the inorganic clay particulates to the consolidating agent in the fluid is less than about 10 percent. In certain embodiments, said ratio is less than about 5 percent. In certain embodiments, said ratio is from about 1 percent to about 5 percent.

The treatment fluids used in the methods and systems of the present disclosure may comprise any consolidating agent known in the art, including resins, tackifiers, silane coupling agents, and any combinations thereof. No particular mechanism of consolidation or stabilization is implied by the term "consolidating agent." The consolidating agents used in the treatment fluids of the present disclosure may provide adhesive bonding between formation particulates and/or proppant particulates to alter the distribution of the particulates within the formation in an effort to reduce their potential negative impact on permeability and/or fracture conductivity. In some embodiments, the consolidating agents may cause formation particulates and/or proppant particulates to become involved in collective stabilized masses and/or stabilize the formation particulates and/or proppant particulates in place to prevent their migration that might negatively impact permeability and/or fracture conductivity.

Resins suitable for use in the methods and/or treatment fluids of the present disclosure include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present disclosure and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component FIT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present disclosure. Some preferred solvents are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure. Resins suitable for use in the treatment fluids of the present disclosure include all resins known in the art that are capable of forming a hardened, consolidated mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present disclosure and to determine whether a catalyst is required to trigger curing.

One resin-type coating material suitable for use in the methods of the present disclosure is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a organosilane coupling agent, a surfactant, an optional hydrolyzable ester for, among other things, breaking gelled fracturing fluid films on the proppant particles, and an optional liquid carrier fluid for, among other things, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be used in the hardenable resin component include, but are not limited to, organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether resin, and combinations thereof. The hardenable resin used is included in the hardenable resin component in an amount in the range of from about 60% to about 100% by weight of the hardenable resin component. In some embodiments the hardenable resin used is included in the hardenable resin component in an amount of about 70% to about 90% by weight of the hardenable resin component.

Still another resin suitable for use in the methods of the present disclosure is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based consolidation fluids of the present disclosure include, but are not limited to butyl acetate, butyl lactate, furfuryl acetate, and 2-butoxy ethanol. Of these, 2-butoxy ethanol is preferred.

In certain embodiments, the treatment fluids used in the methods and systems of the present disclosure optionally may comprise any number of additional additives. Examples of such additional additives include, but are not limited to, salts, surfactants, acids, diverting agents, fluid loss control additives, gas, nitrogen, carbon dioxide, surface modifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The treatment fluids of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the and/or other components of the treatment fluid may be metered directly into a base fluid to form a treatment fluid. In certain embodiments, the base fluid may be mixed with the inorganic clay particulates, proppant, consolidating agents, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

In some embodiments, proppant is mixed with the consolidating agent and the inorganic clay particulate at the surface and then placed in the subterranean formation. In some embodiments, the consolidating agent may comprise two parts, e.g., a curing agent and the resin. In some embodiments, the deagglomerated inorganic clay particulate may be mixed with resin, the curing agent, or both before being placed within the subterranean formation. In some embodiments, the deagglomerated inorganic clay particulate is mixed with the proppant particulate and then placed in the subterranean formation. In some embodiments, the inorganic clay particulate is mixed with the proppant particulate using a dry screw or sand screw technique.

The present disclosure in some embodiments provides methods for using the treatment fluids to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, the treatment fluid further comprising an acid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (for example, in acidizing treatments). Introduction of the treatment fluid may in some of these embodiments be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing).

In some embodiments of the present disclosure in which proppant particulates are coated with the consolidating agents or the inorganic clay particulates described herein, the consolidating agents or the inorganic clay particulates may be either dry-coated or wet-coated onto the proppant particulates. A combination of dry-coating and wet-coating may also be employed, wherein either a liquid curable resin or a liquid curing agent is dry-coated onto the proppant particulates and the other is wet-coated onto the proppant particulates. In some embodiments, the proppant particulates may be coated prior to introducing them into the subterranean formation (i.e., forming coated proppant particulates before introducing them into the formation). In other embodiments, the proppant particulates may be coated on-the-fly simultaneously as the proppant particulates are introduced into the subterranean formation by placing the proppant particulates and the consolidation composition into a treatment fluid and allowing the proppant particulates to become coated with the consolidation compositions as the treatment fluid is introduced into the subterranean formation.

In some embodiments of the present disclosure, the methods may comprise consolidating a plurality of unconsolidated particulates on a wellbore surface or elsewhere in a subterranean formation. Consolidating a wellbore surface may stabilize the wellbore surface in loosely consolidated formations. In some embodiments of the present disclosure, consolidating a plurality of particulates may comprise consolidating a proppant pack. In other embodiments of the present disclosure, consolidating a plurality of particulates may comprise consolidating a gravel pack. In still other embodiments of the present disclosure, consolidating a plurality of particulates may comprise controlling fines in the subterranean formation.

In some embodiments, the treatment fluid, which may or may not comprise proppant, is introduced into a subterranean formation with an pre-existing proppant pack deposited therein and functions as a remedial treatment fluid. In some embodiments, the treatment fluid comprises a proppant that is deposited within the subterranean formation and functions as a primary treatment fluid for forming a proppant pack. In some embodiments, the proppant particulates may be coated with the consolidating agent and/or the inorganic clay particulate. In some embodiments, the coating is achieved through use of a sand screw or dry screw technique. In some embodiments, these packs are formed as "pillars" to hold open the fractures. In some embodiments, the treatment fluid is placed within a subterranean formation for fines control, such that the treatment fluid may at least partially agglomerate or prevent the flow of fines. In some embodiments, a secondary overflush treatment fluid is introduced to displace the excess treatment fluid. In some embodiments, the consolidating agent within the treatment fluid is allowed to at least partially set within the subterranean formation.

To facilitate a better understanding of the present disclosure, the following examples of certain aspects of preferred embodiments are given. The following examples are not the only examples that could be given according to the present disclosure and are not intended to limit the scope of the disclosure or claims.

Example 1

In a first experiment, the compressive strength of systems comprising a plurality of deagglomerated inorganic clay particulates and consolidating agent was tested. First, four different solutions of Expedite 225 resin (A and B components) (available from Halliburton Energy Services) and halloysite powder (available from Sigma Aldrich) were prepared. The concentration of the Halloysite in each solution is summarized in the table below.

TABLE 1

| Resin System | Expedite 225 (A + B) (w/w %) | Halloysite (w/w %) |
|---|---|---|
| 1 | 100% | 0% |
| 2 | 97.5% | 2.5% |
| 3 | 95% | 5% |
| 4 | 90% | 10% |

Then, eight 200 gram samples of 40/70 sand were prepared, and the samples were split into two groups of four samples each. Each sample was treated with one of the four resin systems described in Table 1 above. The samples in the first group were treated with resin in the amount of 1% (w/w of resin system to sand). The samples in the second group were treated with resin in the amount of 2% (w/w of resin system to sand). Then the samples were rinsed with tap water three times and packed into a syringe with a diameter of approximately 1 inch and a length of approximately 3 inches. The syringes were then placed into an oven to cure at 200° F. for 48 hours. After curing, the samples were removed from the syringes and cut into 1"×2" pieces.

The samples were then subjected to unconfined compression strength tests (UCS). The test involves placing the sample on a plate of a compression machine and then applying increasing compressive load until the sample develops failure surfaces. The results of the tests are summarized in Table 2 below. These results demonstrate that inclusion of up to 10% (w/w) halloysite into the resin system creates a resin system of comparable consolidation strength as a system with only resin.

| Sample | Concentration (w/w of sand) | Unconfined Compressive Strength (PSI) |
|---|---|---|
| 1 (no halloysite) | 1% | 273 |
| 2 | 1% | 253 |
| 3 | 1% | 262 |
| 4 | 1% | 147 |
| 1 (no halloysite) | 2% | 878 |
| 2 | 2% | 851 |
| 3 | 2% | 860 |
| 4 | 2% | 640 |

Example 2

In a second experiment, the permeability of a system comprising deagglomerated inorganic clay particulate and consolidating agent was tested. First, two samples of 36 grams of sand were created. The first sample was mixed with 1 gram of hectorite nanoparticles, and the second sample was not mixed with hectorite. The samples were then treated with Expedite 225 resin (A and B components) in the amount of 3% (w/w of resin to sand). The sand packs were then packed into syringes with a diameter of approximately 1 inch, and placed into an oven to cure at 200° F. for 48 hours.

After curing, the syringes were filled with 60 ml of water. Then the flow of the 60 ml of water through the sand pack was observed. In both samples, the water passed through the column in less than 30 seconds. This result demonstrates that the inclusion of hectorite particles does not have a significant impact on permeability of sand packs after consolidation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation m which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
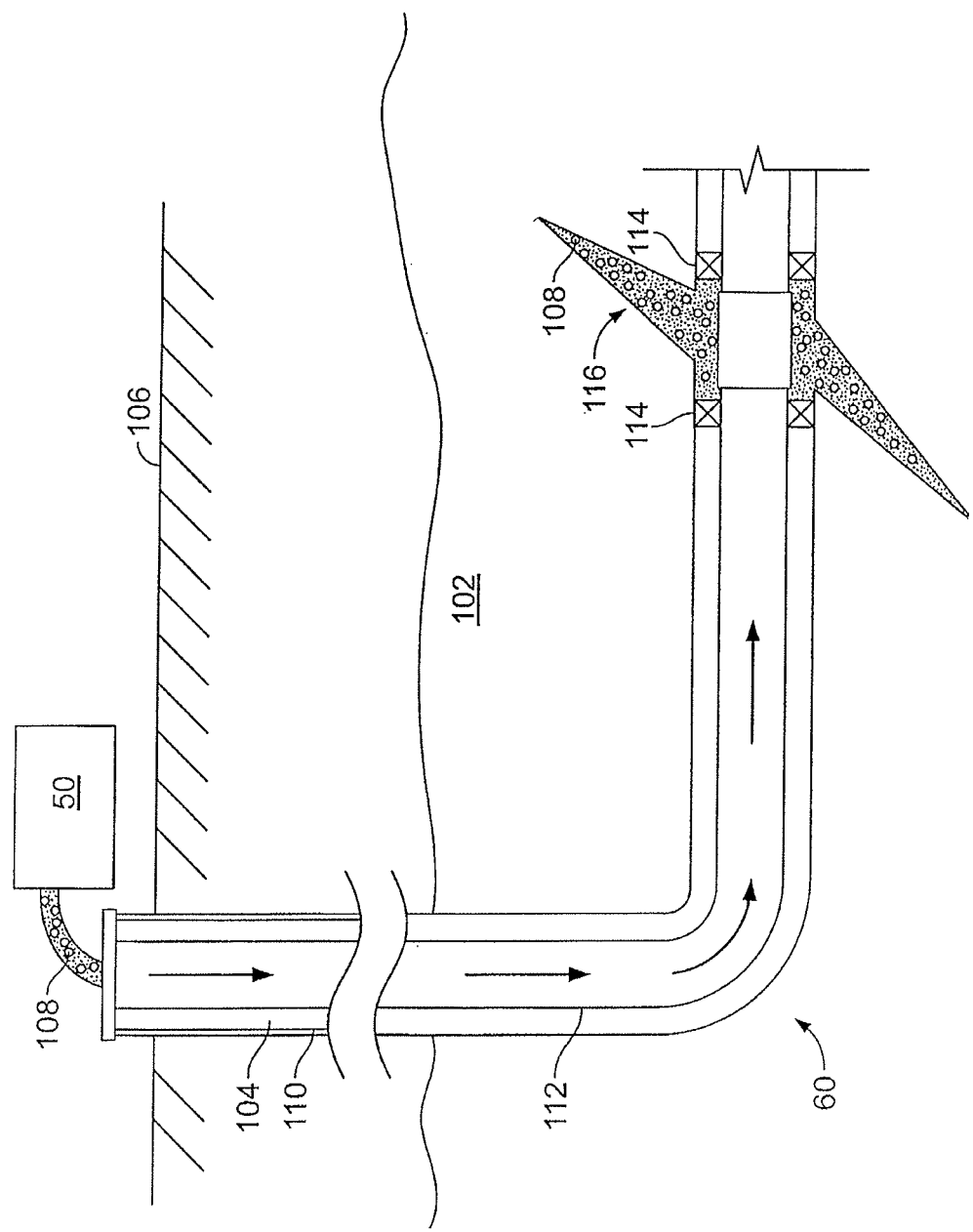
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising providing a treatment fluid that comprises a base fluid, a consolidating agent, and an deagglomerated inorganic clay particle; introducing the treatment fluid into at least a portion of a subterranean formation so as to contact unconsolidated particles within the subterranean formation with the treatment fluid; and allowing the consolidating agent and the deagglomerated inorganic clay particle to consolidate at least a portion of the unconsolidated particulates in the portion of the subterranean formation.

Another embodiment of the present disclosure is a method comprising: providing a consolidating agent, a plurality of proppant particulates, and an deagglomerated inorganic clay particulate; introducing the consolidating agent, the plurality of proppant particulates, and the deagglomerated inorganic clay particulates into at least a portion of a subterranean formation; allowing the consolidating agent to at least partially coat the proppant particulates, thereby creating coated proppant particulates; and placing the coated proppant particulates and the deagglomerated inorganic clay particulate in at least a portion of the subterranean formation so as to form a proppant pack.

Another embodiment of the present disclosure is a well treatment fluid comprising: a base fluid, a plurality of inorganic deagglomerated clay particulates, and a consolidating agent.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid that comprises a base fluid, a consolidating agent, and a plurality of deagglomerated inorganic clay nanotubes, wherein at least 50% of the deagglomerated inorganic clay nanotubes are individual nanotubes;
introducing the treatment fluid into at least a portion of a subterranean formation so as to contact unconsolidated particulates in the subterranean formation with the treatment fluid; and
allowing the consolidating agent and the deagglomerated inorganic clay nanotubes to consolidate at least a portion of the unconsolidated particulates in the portion of the subterranean formation.

2. The method of claim 1, wherein the deagglomerated inorganic clay nanotubes comprise at least one material selected from the group consisting of: halloysite, hectorite, aluminum silicate, and any combination thereof.

3. The method of claim 1, wherein at least a portion of the deagglomerated inorganic clay nanotubes have a length of from about 1 pm to about 1000 nm.

4. The method of claim 1, wherein the consolidating agent comprises at least one agent selected from the group consisting of: a resin, a silane coupling agent, and any combination thereof.

5. The method of claim 1, further comprising allowing the consolidating agent to form a coating on the unconsolidated particulates.

6. The method of claim 1, wherein the treatment fluid further comprises a foamer.

7. The method of claim 1, wherein at least a portion of the deagglomerated inorganic clay nanotubes have a length of from about 0.2 nm to about 1 nm.

8. A method comprising:
providing a consolidating agent, a plurality of proppant particulates, and deagglomerated inorganic clay nanotubes, wherein at least 50% of the deagglomerated inorganic clay nanotubes are individual nanotubes;
introducing the consolidating agent, the plurality of proppant particulates, and the deagglomerated inorganic clay nanotubes into at least a portion of a subterranean formation;
allowing the consolidating agent to at least partially coat the proppant particulates, thereby creating coated proppant particulates; and
placing the coated proppant particulates and the deagglomerated inorganic clay nanotubes in at least a portion of the subterranean formation so as to form a proppant pack.

9. The method of claim 8, wherein at least a portion of the deagglomerated inorganic clay nanotubes have a length of from about 1 pm to about 1000 nm.

10. The method of claim 8, wherein the deagglomerated inorganic clay nanotubes comprise at least one material selected from the group consisting of: halloysite, hectorite, aluminum silicate, and any combination thereof.

11. The method of claim 8, wherein the consolidating agent comprises at least one agent selected from the group consisting of: a resin, a silane coupling agent, and any combination thereof.

12. The method of claim 8 wherein the consolidating agent, the plurality of proppant particulates, and the deagglomerated inorganic clay nanotubes are provided in a treatment fluid that is introduced into the portion of the subterranean formation using one or more pumps.

13. The method of claim 8, wherein at least a portion of the deagglomerated inorganic clay nanotubes have a length of from about 0.2 nm to about 1 nm.

* * * * *